April 3, 1956    O. W. BOUGHTON ET AL    2,740,328
FOCUSING LENS MOUNTING FOR CYLINDRICAL LENSES
Filed July 24, 1953
FIG. 2
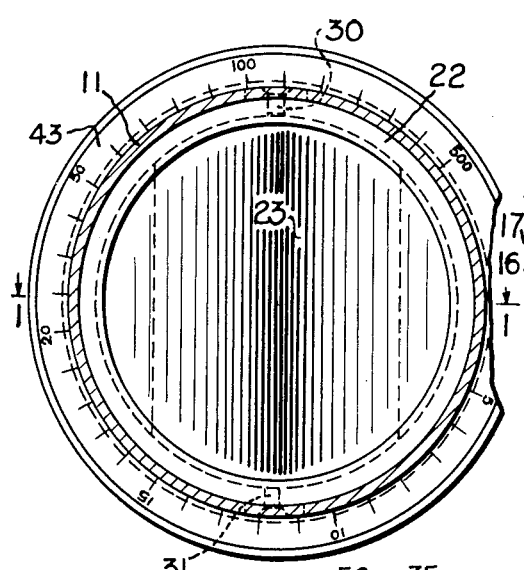
FIG. 1
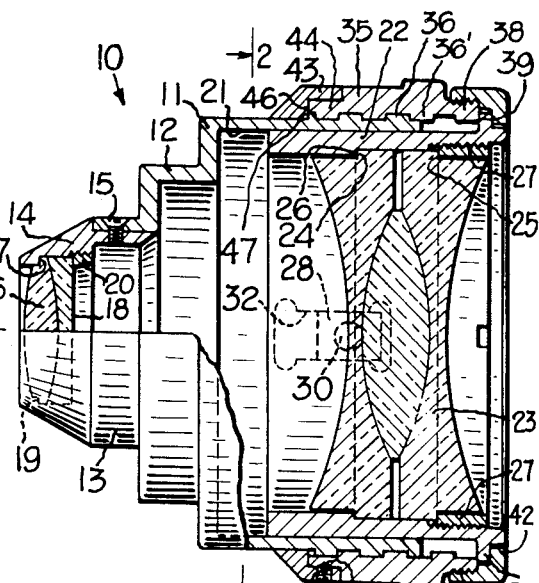
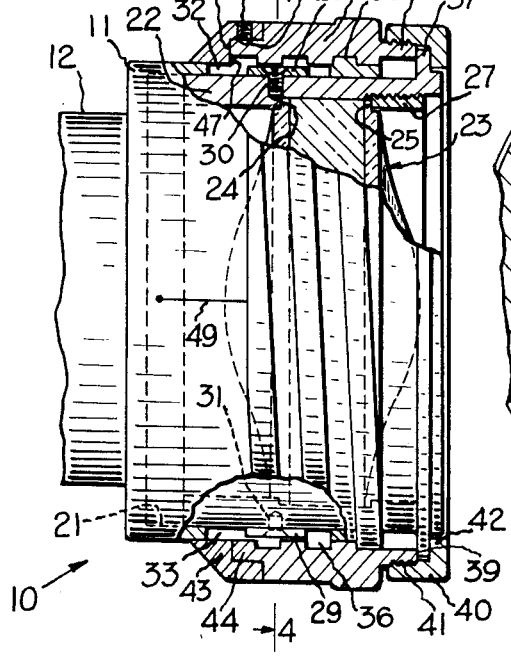
FIG. 3
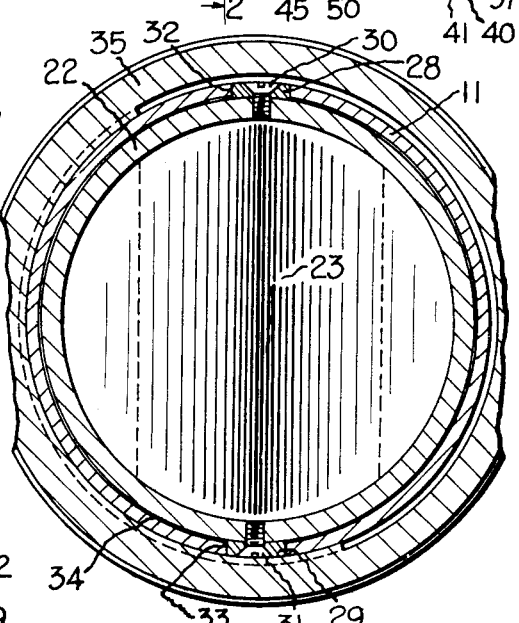
FIG. 4
INVENTORS
OLIN W. BOUGHTON
EDWIN J. BRINKMAN
BY CHARLES J. DeGRAVE Jr.
ATTORNEY

United States Patent Office 2,740,328
Patented Apr. 3, 1956

2,740,328

FOCUSING LENS MOUNTING FOR CYLINDRICAL LENSES

Olin W. Boughton, Canandaigua, Edwin J. Brinkman, Rochester, and Charles J. De Grave, Jr., Chili, N. Y., assignors to Bausch & Lomb Optical Company, Rochester, N. Y., a corporation of New York Application July 24, 1953, Serial No. 370,192

2 Claims. (Cl. 88—57)

This invention relates to a mechanical mounting for the cylindrical lenses such as may be used in an anamorphic lens attachment for camera and projector objectives and more particularly it relates to improvements in the construction of a focusing type of mount for such an attachment.

Lens mounts for anamorphic cylindrical lenses of the type herebelow described are intended for use in high precision cameras and projectors such as those used in the motion picture industry. Consequently, the optical and mechanical requirements of such a lens attachment involve special problems in the construction and precise alignment of its component optical and mechanical parts.

It is an object of this invention to provide a novel focusing mounting for the cylindrical lenses which holds said lenses in precise optical alignment in all its operative positions by means which are reliable, rugged and compact.

It is a further object to provide such a device which is inexpensive to manufacture, assemble and adjust, and is constructed to exclude foreign matter.

Further objects and advantages will be apparent in the details of construction, and the arrangement and combination of the parts by reference to the following specification and accompanying drawing in which:

Fig. 1 is a horizontal sectional view, partly broken away, of a preferred form of this invention.

Fig. 2 is a sectional view taken on the line 2—2 of Fig. 1.

Fig. 3 is a side elevation of the mount shown in Fig. 1 with some parts thereof broken away and shown in section, and Fig. 4 is a sectional view taken on the line 4—4 of Fig. 3.

A preferred embodiment of this invention is shown in the drawings in which an anamorphic lens attachment is generally shown at 10 in Fig. 1. Said lens attachment 10 comprises a cylindrical tubular body or support member 11 which is reduced in diameter to form a round clamping surface 12 which may be fitted to a holding bracket or tube, not shown. Adjacent to surface 12, the body is still further reduced in diameter to form a rearwardly extending tubular extension 13. In this form of the invention, the interior surface of extension 13 is sized to receive a lens cell 14 which is held therein by any suitable means such as several screws, one of which is shown at 15, extending through the body member 11 and threaded in the lens cell. A rear cylindrical lens 16, having a pair of mounting shoulders 17 and 18 thereon, is clamped in the cell against an interior mounting shoulder 19 by a clamping ring 20 threaded therein. The body member 11 is provided with a smooth bore 21 within which a cylindrical lens barrel member 22 is slidably fitted for longitudinal focusing movement. Within the barrel member 22 is mounted a front cylindrical lens 23 having a radial mounting shoulder 24 which is urged against the shoulder 26 on the mounting by a clamping ring 27 which is threaded at 27' and in engagement with the lens shoulder 25.

For proper optical performance, precise alignment of the axes of the cylindrical lenses 16 and 23 in a single vertical plane must be maintained for all positions of the movable lens 23. Such a requirement is accomplished by this invention by longitudinal lens guiding means comprising two or more longitudinal keys which guide the focusing movements of the lens barrel 22 in the body 11. In the form of the invention here described, two flat longitudinally extending keys 28 and 29 are secured at substantially opposite locations on the outer surface of the lens barrel 22, preferably by the screws 30 and 31, respectively, which pass through the keys and are threaded into the lens barrel 22. These keys 28 and 29 are installed parallel to each other and are provided with parallel straight sides which are closely fitted to slide along the parallel side walls of the respective longitudinally extending keyways 32 and 33 formed in the curved wall of the body member 11. It will be seen that if only a single key is used, as in the usual construction, the lens barrel 22 may rock laterally from side to side in its support tube 11 by an amount proportional to the amount of the clearance space between the lens barrel 22 and its supporting body 11. Such a movement would tilt the axis of the cylinder lens 23 out of alignment with the axis of the cylinder lens 16.

By reference to Fig. 4, the advantages to be gained by the above-described arrangement of two keyways 32 and 33 can best be understood. This figure shows the interfitting support member 11 and barrel 22 as having an annular clearance 34 therebetween, with the clearance shown greatly exaggerated. When manufacturing thin walled tubular parts which are slidable one within another, it is necessary to provide an unusually large operating clearance therebetween to take care of small eccentricities, lack of roundness, taper and other imperfections of the production machining operations which are cumulative and are very difficult to correct. In cylindrical lenses of the type here described, tilting of the cylindrical axis of lens 23 with respect to the cylindrical axis of lens 16 must be held to not more than an angle of about 5 minutes. If this problem is solved by merely insisting on accepting only perfect parts, the cost of manufacture is far too high because the production rate for such manufacture of perfectly fitting tubes is extremely low. Still referring to Fig. 4, it will be seen that the angular tilt of the cylindrical axis of lens 23 laterally is entirely controlled by the two keys 28 and 29 which are widely spaced substantially uniform distances apart and are carefully fitted in their respective keyways so that variations in the diametrical clearances between the lens barrel member and its support member are inconsequential and may be tolerated to a large degree. If desired, more than two guide keys and keyways may be used for guiding the lens with a precise control of axial tilt in more than one plane. Thus, for example, three sets of keys and keyways, spaced about 120° apart, could be used for holding the axes of the lenses in alignment within close tolerances such as 3–5 minutes of arc.

To move the barrel 22 longitudinally for focusing adjustments, there is rotatably mounted on the outer surface of the tubular support member 11 a focusing sleeve 35 which is connected thereto by wide-land threads 36 and 36' formed cooperatively on the sleeve and support members, respectively. The front end of the lens barrel 22 has a radially projecting or peripheral flange 37 which is swivelly connected to the sleeve 35 for longitudinal propulsion of the barrel. The swivel connection comprises an annular extension 38 located on the front end of the focusing sleeve 35, said extension having a radial front end face 39 against which the rear side of flange 37 rests. On said extension a swivel ring 40 is secured, preferably by the thread 41, and said ring is provided with an inwardly directed flange 42 which covers the front face of the lens barrel flange 37 and completes the swivel mechanism. In effect, the radial face 39 and the opposite face on the flange 42 form two sides of a circumferential groove in which the flange 37 is rotatable and closely fitted to prevent axial shake or looseness. Furthermore, a portion of the rear face of the flange 37 forms a stop surface for limiting the travel of the focusing sleeve 35 in a rearward direction by reason of its abutment against the end of the support member 11. It will be apparent that rotation of the sleeve 35 will, through the flange 37, produce a longitudinal movement of barrel 22 carrying the lens 23 to effect focusing adjustments thereof.

At the other end of the focusing sleeve 35, a focusing scale ring 43 is demountably fixed on a hub-like extension 44 by a suitable locking device such as the set screws 45 which are threaded in the ring and have points adapted to engage in corresponding suitable spot recesses in the extension 44. The scale ring 43 is provided on its front side with an internal radial shoulder 46 in line with a squared abutment surface 47 on the rear end of the thread 36 so that these surfaces are in longitudinally abutting relation. Since the thread 36 has a wide-land or top surface, the end surface 47 is of broad extent circumferentially and provides a durable abutment surface for the scale ring 43 to move against.

In assembling the illustrated form of the lens attachment 10, the rear lens cell 14 is seated in the support member 11 and rotated until the cylindrical axis of the rear cylindrical lens 16 is in approximate alignment with a center line through the two keys 28 and 29 whereupon the preformed holes for the screws 15 are brought into alignment. With these parts thus aligned, the screws 15 are set in place and tightened therein. The lens barrel member 22 having the front cylindrical lens 23 secured therein, is then inserted in the bore 21 and is held with its flange 37 bearing against the end of body member 11 while this partial assembly is mounted on an optical collimating bench. By rotating the lens barrel 22, the respective cylindrical axes of the lenses 16 and 23 are brought into coincidence and then the keys 28 and 29 are clamped in their proper longitudinal positions in their keyways 32 and 33 while the holes for the screws 30 and 31 are drilled, tapped and countersunk. The screws 30 and 31 are set and tightened to hold the keys in place.

With the lenses properly collimated and assembled for focusing movement, the focusing sleeve 35 is threaded onto the support member 11 from the rear until its end face 39 contacts the rear face of flange 37, and the swivel ring 40 is threaded onto the thread 41 to complete the swivel connection between the sleeve 35 and the barrel 22. To complete the assembly, the scale ring 43 is slipped over the hub 44 and rotated until the zero end of the focusing scale is in line with the index mark 49 on the support member 11. With the ring 43 in this position, the holes for the set screws 45 are drilled and tapped and at the same time, the recesses 50 are formed in the hub 44. The scale ring and focusing sleeve are then assembled and locked together by tightening the screws 45.

From the foregoing, it will be apparent that we are able to attain the objects of our invention and provide an improved type of focusing mounting for cylindrical lenses which must be maintained with their cylindrical axes in alignment within small tolerances. With our improved structure and method of assembling, we are able to accomplish this in a highly efficient, yet relatively simple and inexpensive, manner. By employing a plurality of spaced keys and cooperating keyways, the axes of the lenses can be held in alignment despite the inaccuracies in the structure of the body and barrel members. Various modifications can, obviously, be made without departing from the spirit of our invention as pointed out in the appended claims.

We claim:

1. A mounting for cylindrical lens units which have their axes lying in the same plane and are adapted to be longitudinally moved relatively to each other for focusing adjustments, said mounting comprising a cylindrical body member in which one of said lens units is mounted, a cylindrical barrel member in which another lens unit is mounted, said barrel member being freely slidable for longitudinal movement within the body member with a clearance between the members, means for longitudinally moving one member relative to the other, at least two keys secured to one member and extending longitudinally thereof, the other member having at least two longitudinally extending keyways in which the respective keys are slidably mounted, said keyways being located approximately opposite to each other whereby the members will be held against relative rotation and the cylindrical axes of the lens units will be held in alignment for all relative positions of the two members.

2. A focusing mounting for cylindrical lenses comprising a tubular body member carrying a cylindrical lens, a barrel member carrying a second cylindrical lens, said barrel member being slidably mounted within the body member, means for moving the barrel member longitudinally in the body member comprising a peripheral flange carried by the front end of the barrel member, a sleeve threadedly mounted on the outer surface of the body member, a ring threaded to the front end of the sleeve and having an inwardly projecting flange surface, said peripheral flange being positioned between the end of the sleeve and the flange surface on said ring whereby rotation of the sleeve will produce longitudinal movement of the barrel member, and means for holding the members against relative rotation to retain the cylindrical axes of both lenses in the same plane comprising a pair of longitudinal keys secured to the outer surface of the barrel member and positioned substantially opposite each other, said keys being positioned, respectively, in a pair of longitudinally extending keyways formed in the wall of the body member whereby the cylindrical axes of the lenses are held in the same plane within close tolerances for all relative longitudinal positions of the two members.

References Cited in the file of this patent

UNITED STATES PATENTS

| 1,848,402 | Wollensak | Mar. 8, 1932 |
| 1,962,892 | Chretien | June 12, 1934 |
| 2,005,068 | Batsel | June 18, 1935 |
| 2,008,991 | Nowack | July 23, 1935 |
| 2,180,027 | Wittel | Nov. 14, 1939 |
| 2,254,537 | Nerwin | Sept. 2, 1941 |
| 2,456,053 | Doyle | Dec. 14, 1948 |

OTHER REFERENCES

"Wide Screen Photography," by Newcomer, Journal Society Motion Picture Engineers, vol. 20, January 1933, pages 31–53.